US005131500A

United States Patent [19]

Hernick

[11] Patent Number: 5,131,500

[45] Date of Patent: Jul. 21, 1992

[54] VEHICLE HOIST

[76] Inventor: Jack F. Hernick, 6 Carousel Court, Toronto, Ontario, Canada, M6B 3M1

[21] Appl. No.: 638,607

[22] Filed: Jan. 8, 1991

Related U.S. Application Data

[63] Continuation-in-part of Ser. No. 605,339, Oct. 29, 1990.

[51] Int. Cl.[5] ..................... B60S 13/00

[52] U.S. Cl. ..................... 187/8.43; 187/8.54; 254/90

[58] Field of Search ..................... 187/8.41, 8.43, 8.54, 187/8.57, 8.56, 18; 254/124, 90, 9 C, 10 C, 8 R, 122

[56] References Cited

U.S. PATENT DOCUMENTS

| | | | |
|---|---|---|---|
| 1,555,637 | 9/1925 | Davis | 187/8.54 |
| 2,552,974 | 1/1948 | Johnson | 254/89 |
| 3,724,602 | 4/1973 | Hernick | 187/8.54 |
| 3,877,548 | 4/1975 | Hernick | 187/8.43 |
| 4,447,042 | 5/1984 | Masui | 187/8.43 |
| 4,452,340 | 6/1984 | Hernick et al. | 187/8.43 |

FOREIGN PATENT DOCUMENTS

| | | | |
|---|---|---|---|
| 690682 | 9/1930 | France | 187/8.43 |

OTHER PUBLICATIONS

Brochure: Hofmann Parolift (3 pages) Published Prior to Oct. 29, 1990.

Brochure: Argolift Work Centre (1 page) Published Prior to Oct. 29, 1990.

Brochure: Quicklift Model QL 6000 Published Prior to Oct. 29, 1990.

*Primary Examiner*—Robert P. Olszewski
*Assistant Examiner*—Kenneth Noland
*Attorney, Agent, or Firm*—Kenneth M. Garrett

[57] ABSTRACT

In a multi-purpose vehicle hoist including a wheel lift and a chassis lift, the elevational movement of the wheel lift may be used to generate a force to raise the chassis lift.

12 Claims, 3 Drawing Sheets

VEHICLE HOIST

RELATED APPLICATION

This application is a continuation in part of application Ser. No. 605,339, filed Oct. 29, 1990. Pending

FIELD OF INVENTION

This invention relates to improvements to vehicle hoists. It particulary relates to multi-purpose hoists which include a vehicle runway for elevating a vehicle by the wheels, and a chassis lift.

BACKGROUND OF INVENTION

In my U.S. Pat. No. 3,724,602, I describe one such hoist wherein the chassis lift may be coupled to the runway, so as to raise the runway therewith. The runways may be propped in an elevated position and the chassis lift uncoupled and independently displayed. Other multi-purpose hoists of a similar nature are also known in the art, for example where the runway is permanently connected to the elevator and the chassis lift may be coupled for elevation therewith or uncoupled as desired, this also using props for retaining the chassis lift when uncoupled.

In my U.S. Pat. No. 4,452,340, I described a multi-purpose hoist with co-axial elevating cylinders respectively connected to the runway and the chassis lift, which provides for independent operation of the runway and chassis lift without necessitating the use of props. Other hoists are also known wherein the runway is equipped with a built-in chassis lift, which may be otherwise referred to as a chassis jack which term includes a plurality of chassis jacks except where the context indicates otherwise. However, it appears that in each instance a separate motor means is provided for elevating the runway and each chassis jack. While this gives a desirable flexibility of operation it is a relatively expensive expedient.

It is an object of my invention to provide a multi-purpose hoist including a runway and chassis jack wherein the jack may be operated using the motion of the runway generated by the runway elevator.

It is another object of my invention to provide an economic multi-purpose hoist.

It is still another object of my invention to provide a multi-purpose hoist that does not rely on props.

It is yet another object of my invention to provide a multi-purpose hoist that is easily installed, maintained and operated.

SUMMARY OF THE INVENTION

In accordance with one embodiment of the invention, in a vehicle hoist comprising a fixed portion for supporting the hoist from a ground, and an elevating portion including a runway and an elevator for the runway and a chassis jack connected to the runway for elevation thereabove, the improvement comprises providing a lever mounted from the elevating portion for rotation. The lever is arranged such that when it rotates in a first direction it will mechanically raise the chassis jack to elevate it above the runway, and conversely as it rotates in the opposite direction, the chassis jack will be lowered from a raised position. Means is provided for translating the vertical movement of the lever, as it is raised and lowered with the elevating portion, into rotational movement. Accordingly as the runway is raised by the elevator, the chassis jack may be raised conjointly therewith, and as the runway is lowered, the chassis jack may also be conjointly lowered.

Desirably, the means for translating the vertical movement will permit the degree of elevation of the chassis jack above the runway to be varied relative to the vertical movement of the runway whereby the runway elevator may be deployed conjointly with or independently of the operation of the chassis jack. Optionally, the translating means will include a lost motion means to facilitate the independent deployment of the runways.

Suitably, and in keeping with a desire to provide an economic, easily maintained and serviced multi-purpose hoist, the translating means in one form thereof comprises a flexible element which may be conveniently in the form of a cable. This may be used in different manners to constrain the movement of the lever and thereby translate the vertical movement thereof to the requisite rotational movement. In the most simple form of the invention, one end of the cable maybe secured to the distal end of the lever, and the other end of the cable maybe secured to the fixed portion of the hoist. When the runway is in its lowered position, the lever end will be generally horizontal. As the runway is elevated, so the cable urges the lever end downwardly, thereby raising the chassis jack above the runway. It will be appreciated that by adjusting the length of the cable, the degree of elevation of the jack above the runway may be changed for any given elevation of the runway. The length of the cable may be effectively adjusted by simple expedients, for example by changing the fore and aft (i.e. the axial) point of attachment of the cable to the elevating portion or the moving portion of the hoist, or by the use of an adjustable length element such as a hydraulic cylinder, or by means of a winch on which the cable may be stored and from which it may be released. These examples are illustrative only of simple means that may be employed, and other means both complex and non-complex will occur to those skilled in the art and may be preferred under appropriate circumstances for varying the effective length of the cable. It should be emphasised that it is not intended nor is it necessary that the means for adjusting the effective length of the cable serve to generate a lifting force for the chassis jack. Indeed, it is preferred that means be provided to lock the adjustment means following the adjustment of the effective length of the cable to prevent overhauling.

It is not a pre-requisite that the cable length be adjusted prior to the deployment of the chassis jack. In accordance with the preferred embodiment, I provide means for blocking the jack in its elevated position, following which the effective length of the cable may be increased whereby further elevation of the runways is not impeded.

In accordance with another embodiment of the invention, the translating means comprises a telescopic arm, and means which is settable to either permit the telescopic arm to extend freely as the hoist is elevated, whereby the chassis jack will not be raised above the level of the runways, or to block the extension of the telescopic arm, whereby the chassis jack will be raised from the runways conjointly with the elevation of the hoist.

Preferably the means for elevating the runway will be of a "straight lift" type, which is to say that it will elevate the runway with a linear vertical movement unaccompanied by any axial movement of the runway.

The lever arrangement for raising the jack provides a considerable mechanical advantage. Accordingly the tension in the flexible element, where this is used to constrain the movement of the lever, may be relatively low. As the runway is elevated and the lever rotated, the lever will ultimately reach a critical position following which no further translational movement will be possible. Accordingly, any further attempt to elevate the runway would be wholly expended by an increased tension in the translation means and may result in catastrophic damage. Suitably the improved hoist includes a means for preventing the translation means from being overstressed. While this is readily accomplished by using a switch to detect a limit of desired rotation of the lever, which switch could provide an interlock with the elevator control, a more simple expedient may be preferred. As indicated above, I provide means for blocking the jacks in their elevated position, which means can be deployed automatically. Where the cable is stored on the drum of a winch, I provide a shear pin to secure the drum to a shaft on which it is mounted. As the tension in the cable exceeds a predetermined value, the pin will shear to release tension from the cable, and the chassis jack will be blocked in its erect position by the above mentioned blocking means.

The foregoing objects, advantages and features of my invention, together with still further objects, advantages and features thereof will become more apparent from the following description of preferred embodiments thereof, taken in conjunction with the drawings hereto.

DESCRIPTION OF THE PREFERRED EMBODIMENT

Figure 1:
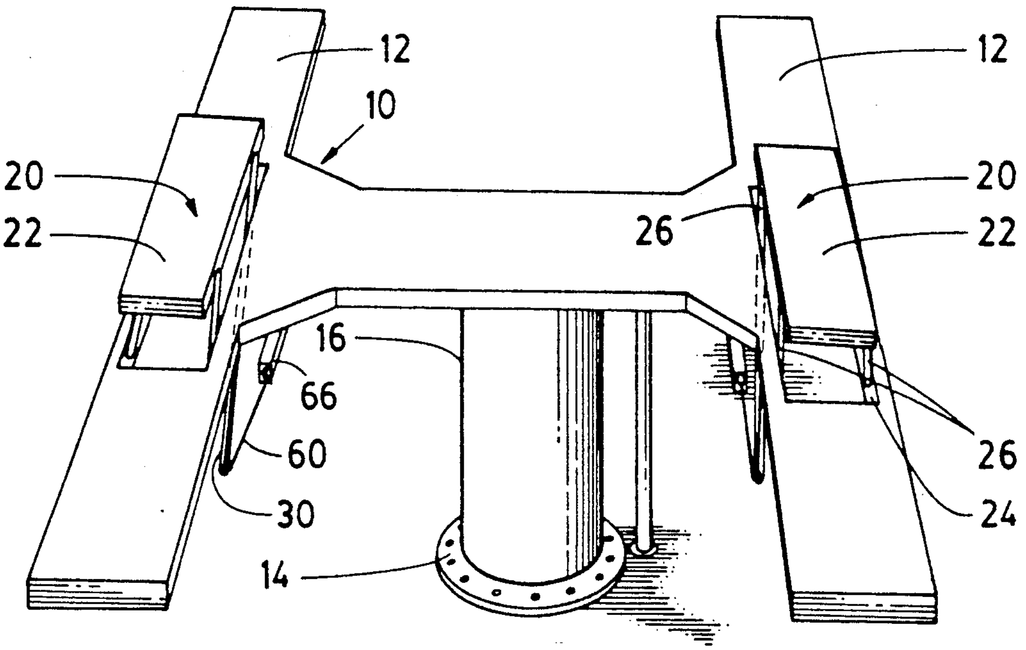
FIG. 1 shows a perspective view from above a vehicle hoist constructed in accordance with my invention
Figure 3:
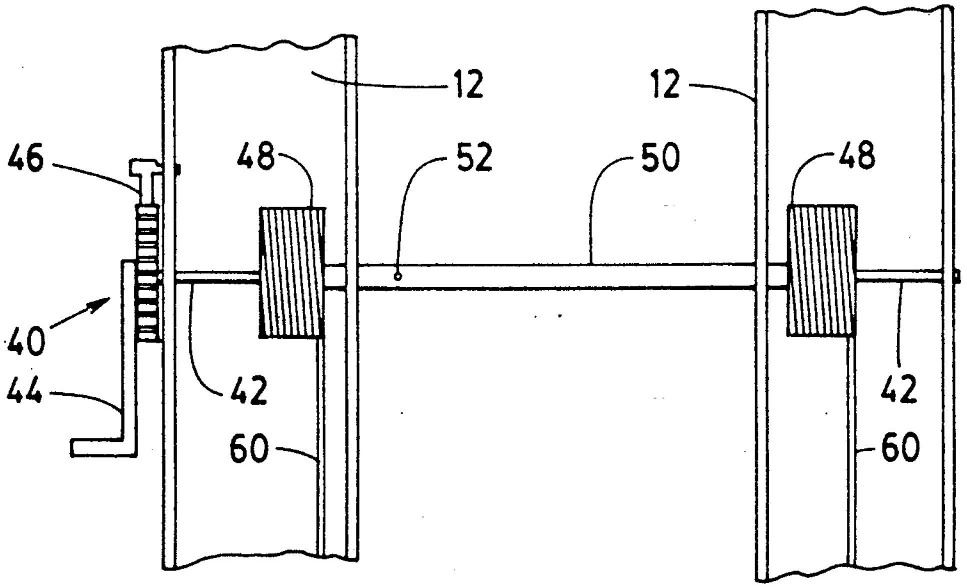
FIG. 3 shows a central portion of the hoist as viewed from the underside.
Figure 2:
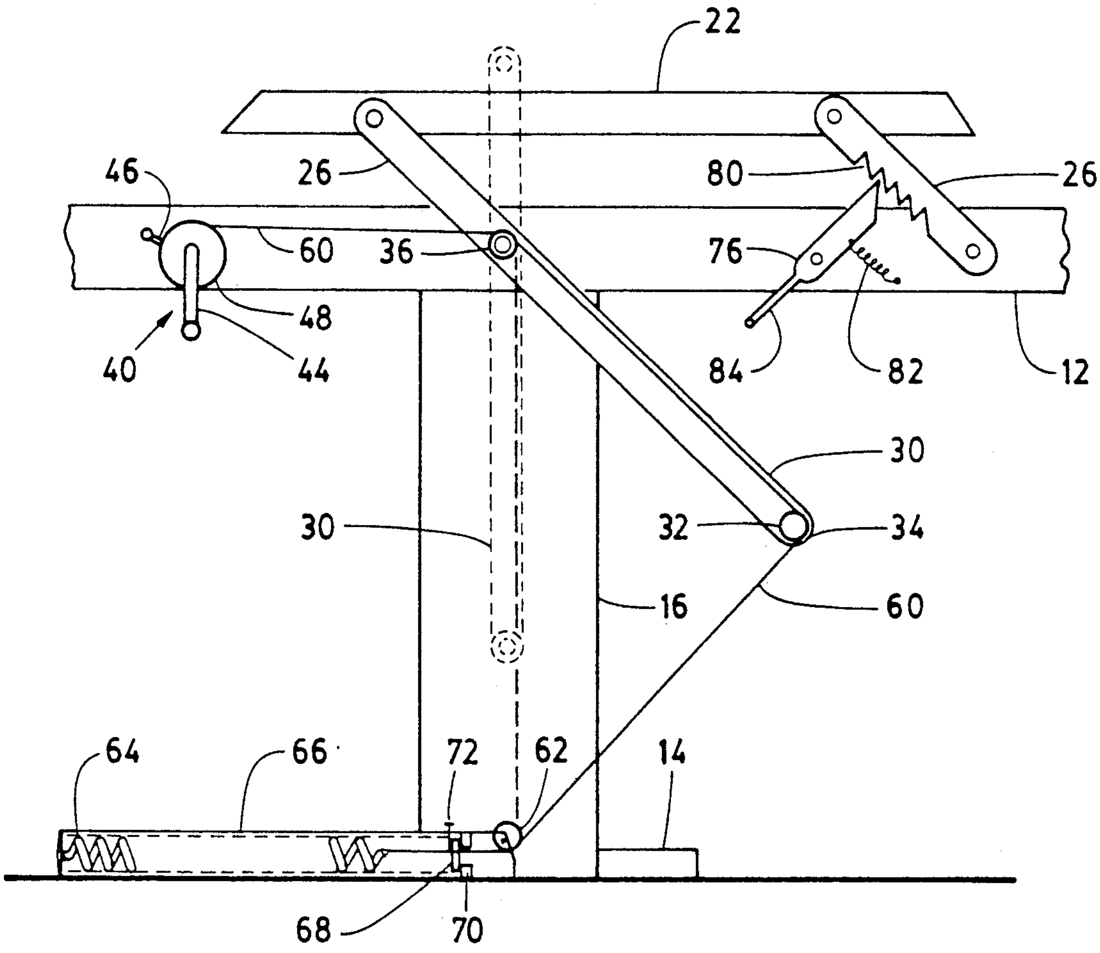
FIG. 2 shows in side elevation a central portion of the hoist of FIG. 1 partly elevated, and in dashed outline an operating portion thereof at a travel limit.

Referring to the figures in detail, a vehicle hoist is identified generally in FIGS. 1-3 thereof by the numeral 10. Hoist 10 comprises a runway 12 for elevating a vehicle by its wheels, and an in-ground hydraulic cylinder 14 having a piston 16 for elevating the runway above the ground.

As referred to herein, the axis of hoist 10 is considered to be aligned with the runway along the length thereof. Hoist 10 will have an axial plane of general symmetry, the left and right sides thereof being with minor exceptions mirror images. For the sake of brevity, the structure of one side only of hoist 10 will be described except where an operating portion extends between the two sides.

Runway 12 is provided on each lateral side with a jack 20 thereon, which comprises a small platform 22 which may conveniently be recessed into an opening 24 formed in runway 12. Platform 22 connects to runway 12 by means of parallel links 26 journalled to the runway at 28 and to the platform, to permit the platform to be raised from the runway while retaining it in parallelism in horizontal planes. As thus far described, hoist 10 is of a conventional nature. One of the links 26 has its lower end extended to form a lever 30. With reference to FIG. 2, it may be seen that as lever 30 rotates about its fulcrum 28 in a clockwise direction towards a vertical position, platform 22 will be progressively raised above runway 12. Conversely as lever 30 is rotated in a counter clockwise direction, platform 22 will be lowered from a raised position onto runway 12.

A first pulley sheave 32 is journalled to lever 30 adjacent the lower end 34 thereof, and a second pulley sheave 36 is journalled at the fulcrum point 28. A small winch 40 is mounted on the underside of runway 12. Winch 40 includes a rod 42 extending between laterally opposed sides of hoist 10, and includes a handle 44 and a ratchet including a pawl 46 to operate the winch. Winch 40 includes a drum 48 associated with each jack 20, which is to say in this instance on each lateral side of hoist 10; the drums are ganged together by a hallow shaft 50 rotatably mounted on rod 42, the shaft and rod being pinned together by a shear pin 52.

A flexible cable 60 is provided having its upper end secured to drum 48, with several turns wrapped therearound. Intermediate portions of cable 60 pass over sheaves 32 and 36, and the lower end of the cable passes under a still further sheave 62 secured in fixed relation to hoist 10. The lower end of cable 60 is secured to a helical spring 64 contained within a hollow tubular housing 66, the side of which as shown in FIG. 2 is removed to reveal interior detail. A clamp 68 is firmly secured to cable 60 adjacent the juncture with spring 64, and a stop 70 is secured to housing 66 adjacent sheave 62 in a position to interfere with clamp 68. A pointer 72 indicates the position of clamp 68 within housing 66.

Means is provided for blocking jacks 20 in an elevated position; for this purpose I provide a finger 76 rotatably mounted to runway 12 about a transverse axis 78. A parallel link 26 adjacent the finger 76 is provided with a plurality of teeth forming a rack 80 therealong engageable by finger 76. Finger 76 is preferably provided with means to bias it into engagement with rack 80, as here illustrated by a spring 82. It is preferred that fingers 76 associated with the left and right hand jacks 20 be coupled together by axis 78. Fingers 76 may be locked in a position so as not to engage with rack 80 by means of a handle 84.

Considering now the operation of this embodiment of hoist 10, with the hoist in the partly elevated position of FIG. 2 in which cable 60 is under tension and with clamp 68 in abutment with stop 70, further elevation of runway 12 will cause lever 30 to rotate in a clockwise direction, and thereby raise platform 22. Ultimately a position will be reached wherein cable 60 and lever 30 are aligned, as shown in dashed outline in FIG. 2. The angle of rotation of lever 30 upon reaching this position, which is referred to as the critical position, will be at a maximum when the lower point of attachment of cable 60 to the frame of the hoist or the ground is in vertical plane of fulcrum 28, which is preferred. When the critical position of lever 30 is reached, any further attempted elevation of runway 12 will be constrained by cable 60. It will be appreciated that the strain in cable 60 will be transferred to shear pin 52; should this shear cable 60 may be freely pulled from drum 48. The blocking action of finger 76 will maintain platform 22 in its raised position.

Figure 4:
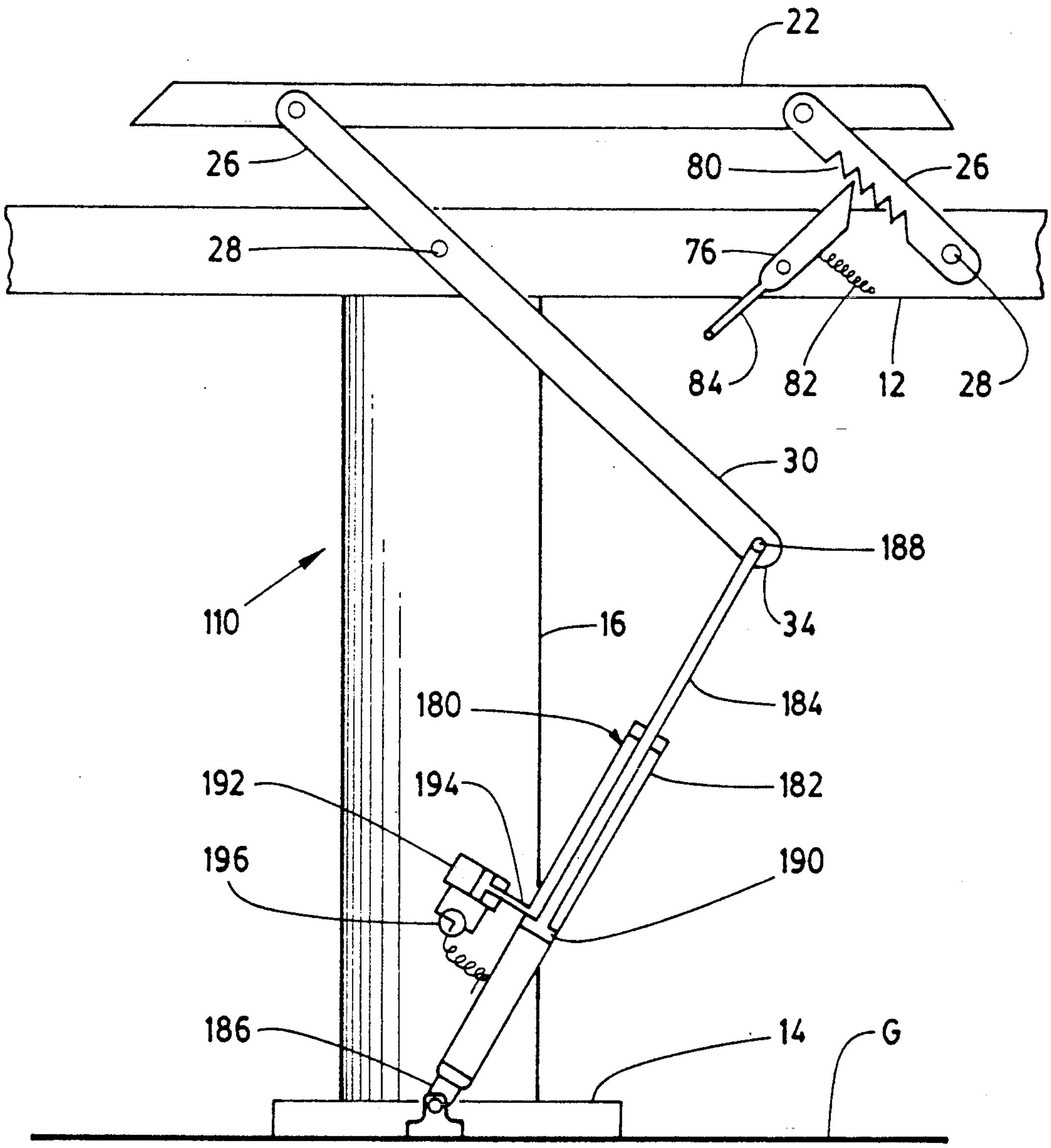
FIG. 4 shows in side elevation a second embodiment of the invention.

In order to elevate runway 12 above the position attained when lever 30 is rotated to its critical position, more cable 60 will be payed out from drum 48. This will normally entail releasing tension from cable 60 by slightly lowering runway 12 until such time as any weight on jack 20 is taken by finger 76, then releasing pawl 46 to permit the cable to be unwound from drum 48. As cable 60 is unwound, it is retracted into housing 66 under the influence of spring 64 thereby urging clamp 68 out of engagement with stop 70. Further elevation of runway 12 will then be permitted, with the tension in cord 60 being expended on spring 64, this thereby providing a lost motion for the hoist. It will be appreciated that this lost motion can be provided irrespective of the rotational position of lever 30, and of the elevation of runway 12. It should also be appreciated that lost motion may be achieved by merely permitting cable 60 to unwind from drum 48 either freely or against a recoil mechanism incorporated therein In the embodiment of FIG. 4, a hoist 110 includes identical elements to certain of those set forth in the description of the first embodiment, which elements are identically numbered. Hoist 110 differs from hoist 10 principally in regard to the means for controlling lever 30, which means comprises a telescopic arm arrangement identified generally by the numeral 180. Arm 180 comprises an outer cylinder 182 and a shaft 184 freely slidable therein. The lower end of cylinder 182 is connected to a ground G vertically beneath the fulcrum point 28 of lever 30 at pivot 186, and the upper end of shaft 184 is connected to the lower end 34 of lever 30 at a journal 188. The lower end of shaft 184 is enlarged to form a head 190 which bears on the inner wall of cylinder 182. A pneumatic actuator 192 is mounted on cylinder 182. Actuator 192 includes a finger 194 which is movable between first and second positions according to the setting of control 196, in which positions it will respectively project within cylinder 182 or be withdrawn therefrom. When in its first position, it will interfere with the extension of arm 180. Accordingly as hoist 110 is elevated, lever 30 will be rotated to raise platform 22 above runway 12. When finger 194 is in its second position, shaft 184 will be withdrawn freely from cylinder 182, whereby lever 30 will not be rotated, and correspondingly platform 22 will not be raised above runway 12 as platform 22 is elevated by piston 16. It will be apparent that the axial location of blocking finger 194 on cylinder 182 will control the degree of lost movement permitted by arm 180. Suitably arm 180 will permit runway 12 to be elevated to a working height of about 75 cm (30 inches) before finger 194 will block the further extension of shaft 184. At any time before the hoist 110 has been raised to the height, an operator may elect to move control 196 to a position wherein finger 194 will be extended or retracted, to thereby cause platform 22 to be raised from runway 12 or remain in its lowered position upon further elevation of the hoist.

The foregoing embodiments are illustrative only of the invention, which may be embodied in widely differently forms particularly as it relates to the translating mechanism, many such translating mechanisms being known in the art. It is intended that the claims annexed hereto cover all embodiments of what has been invented.

I claim:

1. In a vehicle hoist comprising:

a fixed portion for supporting said hoist from a ground and an elevating portion supported from said fixed portion;

said elevating portion comprising a runway for supporting a vehicle by the wheels thereof, and means for elevating said runway above a ground;

a chassis jack for supporting a vehicle by the chassis thereof;

means connecting said chassis jack to said runways for elevation thereabove;

lever means supported from said elevating portion, rotation of said lever means in a first direction serving to raise said chassis lift above said runway and in a second direction opposed to said first direction serving to lower said chassis lift from its raised portion, the improvement comprising a variable length means independent of said means for elevating said runways for translating the vertical movement of said lever means which occurs as said elevating portion is raised and lowered, so as to cause said lever to rotate in said first direction and said second direction respectively; and means for adjusting the length of said variable length means.

2. A vehicle hoist as defined in claim 1, wherein said variable length means includes means for retracting said variable length element.

3. A vehicle hoist as defined in claim 1, wherein said variable length means comprises a flexible element.

4. A vehicle hoist as defined in claim 3, wherein said flexible element has opposed ends, with one said end attaching to said elevating portion of said hoist and the other said end attaching to a fixed portion thereof.

5. A vehicle hoist as defined in claim 1, wherein said means connecting said chassis lift to said runway comprises a plurality of parallel links.

6. A vehicle hoist as defined in claim 5, wherein said lever means forms at least one said parallel link.

7. A vehicle hoist as defined in claim 1, wherein said means for elevating said runway is of a straight lift type.

8. A vehicle hoist as defined in claim 1, comprising means for preventing said elevation means transmitting a catastrophic force to said translation means.

9. A vehicle hoist as defined in claim 1, comprising means for retaining said chassis lift in an elevated position above said runway independently of said translating means.

10. In a vehicle hoist including:

a vehicle runway;

means for elevating said vehicle runway in a linear movement above a ground surface;

a chassis lift;

a plurality of parallel links pivotally connecting said chassis lift to said runway to permit said chassis lift to elevate above said runway in parallelism therewith;

at least one said link extending to form a lever; and means for constraining the upward movement of distal portions of said lever as said elevating means is operated to elevate said runway, to thereby translate said upward movement of said lever to rotational movement and correspondingly elevate said chassis lift; the improvement when said constraining means comprises a telescopically extensible arm, and means for releasably blocking the extension of said arm.

11. A vehicle hoist as defined in claim 10, wherein said elevating means is a straight lift type.

12. A vehicle hoist as defined in claim 10 including means to prevent the transmission of a catastrophic force from said elevating means to said telescopic arm.

* * * * *